(12) United States Patent
Schmidt et al.

(10) Patent No.: US 12,128,621 B2
(45) Date of Patent: Oct. 29, 2024

(54) FABRICATING CERAMIC STRUCTURES

(71) Applicant: RTX Corporation, Farmington, CT (US)

(72) Inventors: Wayde R. Schmidt, Pomfret Center, CT (US); Paul Sheedy, Bolton, CT (US); John A. Sharon, West Hartford, CT (US); Neal Magdefrau, Tolland, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/460,917

(22) Filed: Sep. 5, 2023

(65) Prior Publication Data

US 2023/0405930 A1 Dec. 21, 2023

Related U.S. Application Data

(62) Division of application No. 16/856,433, filed on Apr. 23, 2020, now Pat. No. 11,787,117.

(51) Int. Cl.
| | |
|---|---|
| *B29C 64/291* | (2017.01) |
| *B29C 64/30* | (2017.01) |
| *B33Y 10/00* | (2015.01) |
| *B33Y 30/00* | (2015.01) |
| *C04B 35/64* | (2006.01) |

(Continued)

(52) U.S. Cl.
CPC ............ *B29C 64/291* (2017.08); *B29C 64/30* (2017.08); *B33Y 10/00* (2014.12); *B33Y 30/00* (2014.12); *C04B 35/64* (2013.01); *C04B 41/009* (2013.01); *C04B 41/81* (2013.01); *C04B 2235/6026* (2013.01); *C04B 2235/667* (2013.01)

(58) Field of Classification Search
CPC ...................................................... B28B 1/001
See application file for complete search history.

(56) References Cited

U.S. PATENT DOCUMENTS

| | | |
|---|---|---|
| 4,929,415 A | 5/1990 | Okazaki |
| 7,790,061 B2 | 9/2010 | Gratson et al. |

(Continued)

FOREIGN PATENT DOCUMENTS

| | | |
|---|---|---|
| CN | 108656524 A | 10/2018 |
| DE | 102016217235 A1 | 10/2017 |

(Continued)

OTHER PUBLICATIONS

Fabian "How 3D Printing in Ceramics Really Works" Materialise <https://i.materialise.com/blog/en/going-strong-how-3d-printing-in-ceramics-really-works/> Jun. 5, 2015 (3 pages).

(Continued)

*Primary Examiner* — Timothy Kennedy
(74) *Attorney, Agent, or Firm* — CANTOR COLBURN LLP

(57) ABSTRACT

A fabrication apparatus for fabricating ceramic structures of controlled size and composition is provided. The fabrication apparatus includes an additive manufacturing machine configured to dispense preceramic materials in a printed pattern, the printed pattern corresponding to the ceramic structures of the controlled size and composition, a radiation emitter configured to emit curing radiation toward the printed pattern to cure the preceramic materials and a lamp element configured to shine light on the preceramic materials to convert the preceramic materials to ceramics.

19 Claims, 2 Drawing Sheets

(51) Int. Cl.
*C04B 41/00* (2006.01)
*C04B 41/81* (2006.01)

(56) References Cited

U.S. PATENT DOCUMENTS

| | | |
|---|---|---|
| 8,021,593 B2 | 9/2011 | Murata et al. |
| 9,238,309 B2 | 1/2016 | King et al. |
| 9,987,653 B2 | 1/2018 | Sreenivasan et al. |
| 2011/0187798 A1 | 8/2011 | Rogers et al. |
| 2013/0184142 A1 | 7/2013 | Schmidt |
| 2016/0005700 A1 | 1/2016 | Rogers et al. |
| 2016/0107295 A1 | 4/2016 | Bajaj et al. |
| 2016/0107331 A1 | 4/2016 | Schmidt |
| 2017/0056966 A1 | 3/2017 | Myerberg et al. |
| 2017/0341297 A1 | 11/2017 | Xu et al. |
| 2018/0229433 A1 | 8/2018 | Lan |
| 2018/0304621 A1 | 10/2018 | Byun |
| 2019/0002353 A1 | 1/2019 | Eckel et al. |
| 2019/0047173 A1 | 2/2019 | Schmidt |
| 2020/0023397 A1 | 1/2020 | Hart et al. |
| 2020/0023584 A1 | 1/2020 | Portela et al. |
| 2020/0189280 A1 | 6/2020 | Byun et al. |

FOREIGN PATENT DOCUMENTS

| | | |
|---|---|---|
| DE | 102017007178 A1 | 2/2018 |
| KR | 101704962 B1 | 2/2017 |
| KR | 20180040096 A | 4/2018 |
| KR | 20200028733 A | 3/2020 |
| KR | 20200028859 A | 3/2020 |

OTHER PUBLICATIONS

Search Report issued in European Patent Application No. 21169460. 9; Application Filing Date Apr. 20, 2021; Date of Mailing Jun. 14, 2023 (7 pages).

Search Report issued in European Patent Application No. 21169460. 9; Application Filing Date Apr. 20, 2021; Date of Mailing Oct. 4, 2021 (12 pages).

FABRICATING CERAMIC STRUCTURES

CROSS-REFERENCE TO RELATED APPLICATIONS

This application is a division of U.S. application Ser. No. 16/856,433 filed Apr. 23, 2020, the disclosure of which is incorporated herein by reference in its entirety.

BACKGROUND

Exemplary embodiments of the present disclosure relate generally to fabrication methods and, in one embodiment, to fabrication of ceramic structures.

High-resolution ceramic structures can be used for heat transfer, dielectric functionality, structural enhancement and other applications. Similarly, controlled surface textures, compositions, and feature sizes are often desired to enhance coating performance and adhesion. Existing methods are typically unable to directly produce such ceramic features on surfaces, however, and instead require indirect or transfer methods with ceramic slurries, etching, or vapor deposition.

Accordingly, a need exists for methods of fabricating high-resolution ceramic structures with, in some cases, controlled surface textures.

BRIEF DESCRIPTION

According to an aspect of the disclosure, a fabrication apparatus for fabricating ceramic structures of controlled size and composition is provided. The fabrication apparatus includes an additive manufacturing machine configured to dispense preceramic materials in a printed pattern, the printed pattern corresponding to the ceramic structures of the controlled size and composition, a radiation emitter configured to emit curing radiation toward the printed pattern to cure the preceramic materials and a lamp element configured to shine light on the preceramic materials to convert the preceramic materials to ceramics.

In accordance with additional or alternative embodiments, the printed pattern corresponding to the ceramic structures of the controlled size and composition has features with sizes on the order of about 100 microns or less or about 10 microns or less.

In accordance with additional or alternative embodiments, the printed pattern is dispensed on a substrate and the substrate includes at least one or more of metallic materials, polymeric materials, carbon-based materials, composite materials, ceramic materials, glass materials and glass/ceramic materials.

In accordance with additional or alternative embodiments, the additive manufacturing machine includes a heating element to heat the preceramic materials and a stage heater to heat a substrate on which the printed pattern is dispensed.

In accordance with additional or alternative embodiments, the additive manufacturing machine is configured to execute electrohydrodynamic (EHD) deposition.

In accordance with additional or alternative embodiments, the preceramic materials include resins with or without fillers, the resins comprising at least one or more of polysilanes, polysiloxanes, polycarbosilanes, polysilazanes, polycarbosiloxanes, polycarbosilazanes, polyborosiloxanes and metal-modified derivatives and the fillers include at least one or more of carbides, nitrides, borides, phosphides, carbonitrides, oxides, glasses, glass-ceramics, or metals, including aluminum, copper, silicon, titanium, vanadium, chromium, iron, cobalt, nickel, zinc, hafnium, zirconium, yttrium, lanthanum, ytterbium, gadolinium, niobium, tantalum, boron, tungsten, rhenium, molybdenum, gold, silver, platinum and palladium.

In accordance with additional or alternative embodiments, the lamp element includes a xenon flash lamp operable to generate intense pulsed light (IPL) to convert the preceramic materials to ceramics in about 1 second or less.

According to an aspect of the disclosure, a method of fabricating ceramic structures of controlled size and composition is provided and includes printing a pattern of uncured preceramic materials, curing the pattern and converting the preceramic to ceramic.

In accordance with additional or alternative embodiments, the pattern includes features having sizes on the order of about 10 microns or less.

In accordance with additional or alternative embodiments, the preceramic materials include resins with or without fillers, the resins comprising at least one or more of polysilanes, polysiloxanes, polycarbosilanes, polysilazanes, polycarbosiloxanes, polycarbosilazanes, polyborosiloxanes and metal-modified derivatives and the fillers include at least one or more of carbides, nitrides, borides, phosphides, carbonitrides, oxides, glasses, glass-ceramics, or metals, including aluminum, copper, silicon, titanium, vanadium, chromium, iron, cobalt, nickel, zinc, hafnium, zirconium, yttrium, lanthanum, ytterbium, gadolinium, niobium, tantalum, boron, tungsten, rhenium, molybdenum, gold, silver, platinum and palladium.

In accordance with additional or alternative embodiments, the method further includes at least one of heating the preceramic and heating the pattern.

In accordance with additional or alternative embodiments, the printing includes electrohydrodynamic (EHD) deposition.

In accordance with additional or alternative embodiments, the curing includes exposing the pattern to radiation.

In accordance with additional or alternative embodiments, the converting includes intense pulsed light (IPL) processing.

In accordance with additional or alternative embodiments, the method further includes post-processing the ceramic.

In accordance with additional or alternative embodiments, the post-processing of the ceramic includes applying an additional coating.

According to an aspect of the disclosure, a method of fabricating ceramic structures of controlled size and composition is provided and includes printing a pattern of uncured preceramic materials with features having sizes on the order of about 10 microns or less, radiating curing radiation toward the pattern to cure the pattern and exposing the cured pattern to intense pulsed light (IPL) to convert the preceramic of the cured pattern to ceramic.

In accordance with additional or alternative embodiments, the preceramic materials include resins with or without fillers, the resins including at least one or more of polysilanes, polysiloxanes, polycarbosilanes, polysilazanes, polycarbosiloxanes, polycarbosilazanes, polyborosiloxanes and metal-modified derivatives and the fillers including at least one or more of carbides, nitrides, borides, phosphides, carbonitrides, oxides, glasses, glass-ceramics, or metals, including aluminum, copper, silicon, titanium, vanadium, chromium, iron, cobalt, nickel, zinc, hafnium, zirconium, yttrium, lanthanum, ytterbium, gadolinium, niobium, tantalum, boron, tungsten, rhenium, molybdenum, gold, silver, platinum and palladium.

In accordance with additional or alternative embodiments, the printing includes electrohydrodynamic (EHD) deposition.

In accordance with additional or alternative embodiments, the method further includes at least one of heating the preceramic materials and heating the pattern and applying an additional coating to the ceramic.

These and other advantages and features will become more apparent from the following description taken in conjunction with the drawings.

BRIEF DESCRIPTION OF THE DRAWINGS

The following descriptions should not be considered limiting in any way. With reference to the accompanying drawings, like elements are numbered alike.

These and other advantages and features will become more apparent from the following description taken in conjunction with the drawings.

DETAILED DESCRIPTION

A detailed description of one or more embodiments of the disclosed apparatus and method are presented herein by way of exemplification and not limitation with reference to the Figures.

As will be described below, a method is provided to fabricate ceramic structures of controlled size and composition. The method uses deliberate combinations of electrohydrodynamic (EHD) jetting, or e-jetting, of preceramic resins/slurries in order to deliver a controlled pattern and sizes of desired features onto a substrate. The method can include optional heating of the substrate before/during/after deposition or intense pulsed light (IPL) processing to cure the resin and can be followed by exposure to IPL processing to convert the cured preceramic features into ceramic structures (i.e., crystalline ceramic structures in some cases). E-jetting is capable of handling a wide variety of fluids/slurry/compositions and viscosities and printing features below 10 microns onto large area substrates. IPL has been demonstrated to convert preceramic resins to ceramics in <1 second.

Figure 1:
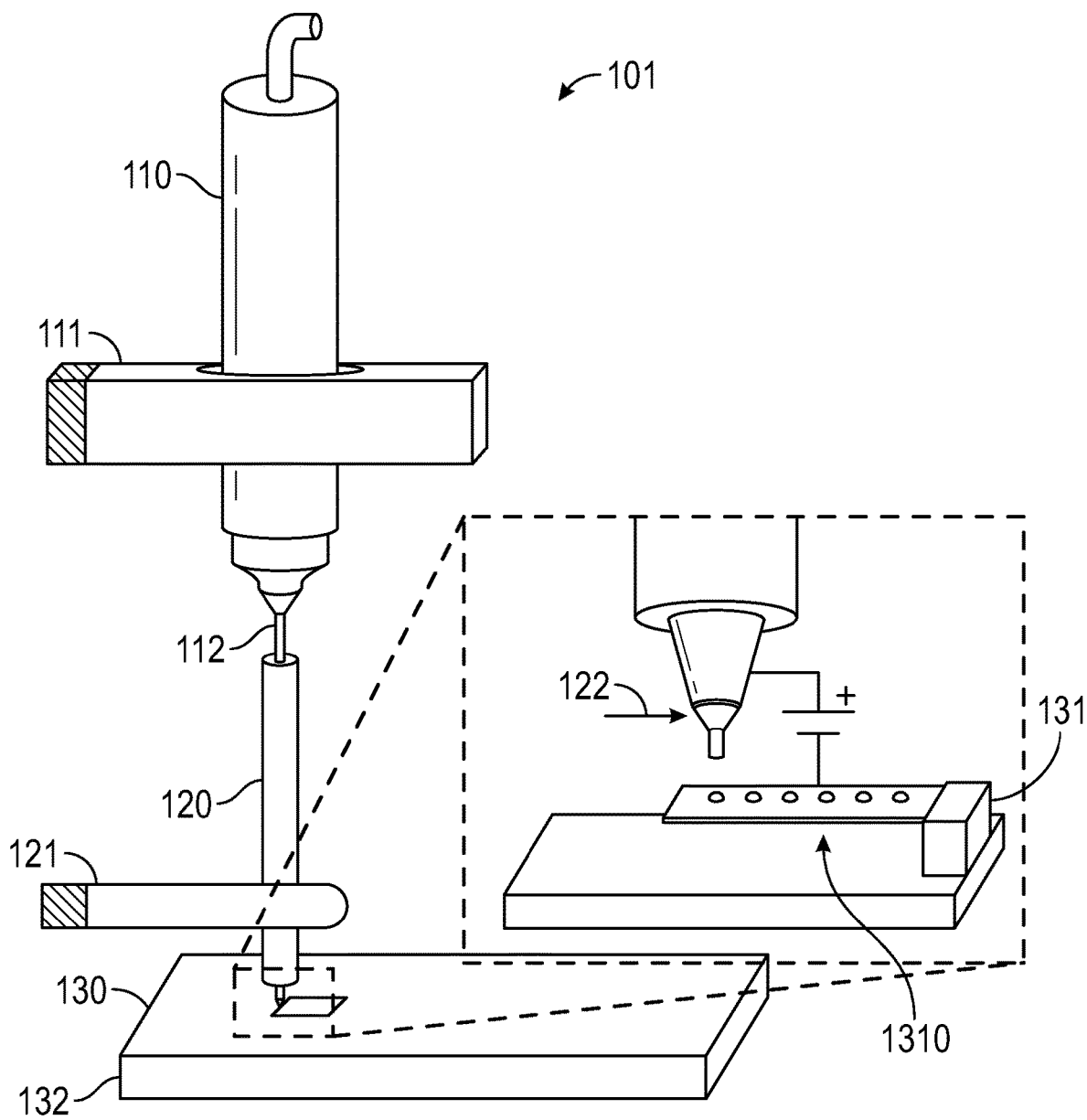
FIG. 1 is a perspective view of an additive manufacturing apparatus for fabricating high-resolution ceramic structures with, in some cases, controlled surface textures in accordance with embodiments.

With reference to FIG. 1, an additive manufacturing machine 101 is provided and includes a syringe 110 with 0-75 psi back pressure capability, a syringe holder 111 to support the syringe 110 and a delivery tube 112 at a distal end of the syringe 110. The additive manufacturing machine 101 further includes a heating element 120, such as a resistively heated cylinder, through which the delivery tube 112 extends as well as a stabilizer 121 to structurally support the heating element 120 and delivery tube 112 and a delivery orifice or nozzle 122 of the delivery tube 112. The delivery tube 112 can be extended through the heating element 120 so that material to be dispensed from the nozzle 122 passes through the heating element 120 whereupon the material is heated before being dispensed through the nozzle 122. The dispensing of the material through the delivery tube 112 and the nozzle 122 can involve EHD jetting, or e-jetting, or other similar processes.

Figure 3:
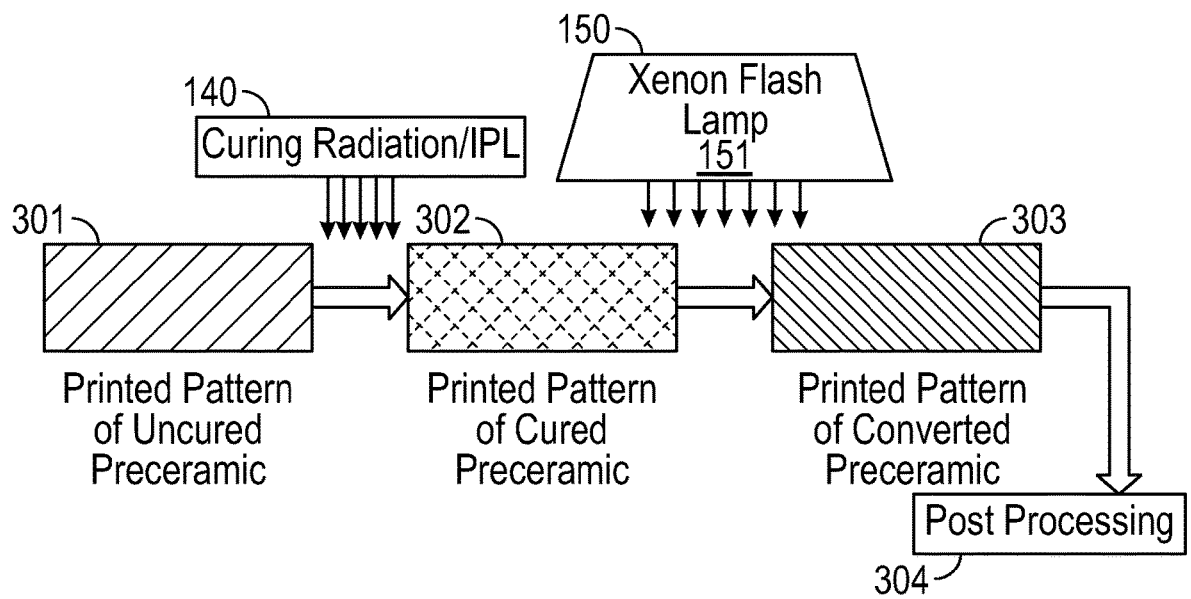
FIG. 3 is a flow diagram of a method of fabricating high-resolution ceramic structures with, in some cases, controlled surface textures in accordance with embodiments.

In addition, the additive manufacturing machine 101 includes a stage assembly 130, a radiation emitter 140 (see FIG. 3) and a lamp element 150 (see FIG. 3). The stage assembly 130 includes a substrate support 131 with a substrate 1310 on which the delivery tube 122 dispenses material via the nozzle 122 and a stage heater 132 that is configured to maintain a temperature of material dispensed onto the substrate 1310. The radiation emitter 140 is configured to emit radiation, such as visible, infrared, ultraviolet, microwave or electron beam curing radiation, onto the material dispensed onto the substrate 1310. The radiation emitter 140 is configured to provide either continuous radiation or pulses of radiation ranging from microseconds to minutes. The lamp element 150 can include or be provided as a xenon flash lamp 151 (see FIG. 3) and is configured to expose a printed pattern/features to pulsed light, such as IPL.

In accordance with embodiments, the radiation emitter 140 can also be configured as a lamp element that is capable of exposing the material dispensed onto the substrate to pulsed light, such as IPL. In these or other cases, the pulsed light or IPL is used to cure and convert the dispensed material.

The material to be dispensed through the delivery tube 112 and the nozzle 122 can include, but is not limited to, preceramic resins, organometallic compounds, metal-organic compounds, oligomeric material and slurries including any of these alone or in combinations. The dispensing pattern can be controlled so as to produce surfaces with desired features in controlled patterns and sizes. The dispensing pattern can be formed by movement of the delivery tube 112 and the nozzle 122 relative to the stage assembly 130, by movement of the stage assembly 130 relative to the delivery tube 112 and the nozzle 122 or some combinations of both types of movements. In any case, the relative movement between the stage assembly 130 and the delivery tube 112 and the nozzle 122 can be in multiple axes (e.g., 5 or more axes) and with multiple degrees of freedom.

In accordance with further embodiments, multiple delivery tubes and nozzles, delivering the same or different materials, can also be provided.

In accordance with embodiments, there can be a voltage drop, potential difference, or bias of hundreds to thousand of volts and a separation of tens to hundreds of micrometers between the nozzle 122 and the substrate 1310.

In accordance with embodiments, exposures of the printed pattern/features to the pulsed light, such as the IPL, can convert preceramic materials to ceramics in less than about 1 second. However, it is to be understood that exposure times vary based on the materials being converted, printed layer thickness(es), feature size(s), etc., and the types, duration and intensities of the radiation to which those materials are being exposed, as well as the total exposure times of each pulse and the pulse-to-pulse frequencies.

In accordance with embodiments, the preceramic resins and the preceramic slurries can include, but are not limited to, at least one or more of polysilanes, polysiloxanes, polycarbosilanes, polysilazanes, polycarbosiloxanes, polycarbosilazanes, polyborosiloxanes, metal-modified derivatives, etc., and combinations thereof, and ceramics can include, but are not limited to, at least one or more of carbides, nitrides, borides, phosphides, carbonitrides, oxides, etc., and combinations thereof and the substrate 1310 can include, but is not limited to, at least one or more of metallic materials, polymeric materials, carbon-based materials, composite materials, ceramic materials, glass materials, glass/ceramic materials and combinations thereof.

The surfaces of the dispensing pattern can have features with sizes on the order of about 100 microns or less. In some cases, the surfaces of the dispensing pattern can have features with sizes on the order of about 10 microns or less.

Figure 2:
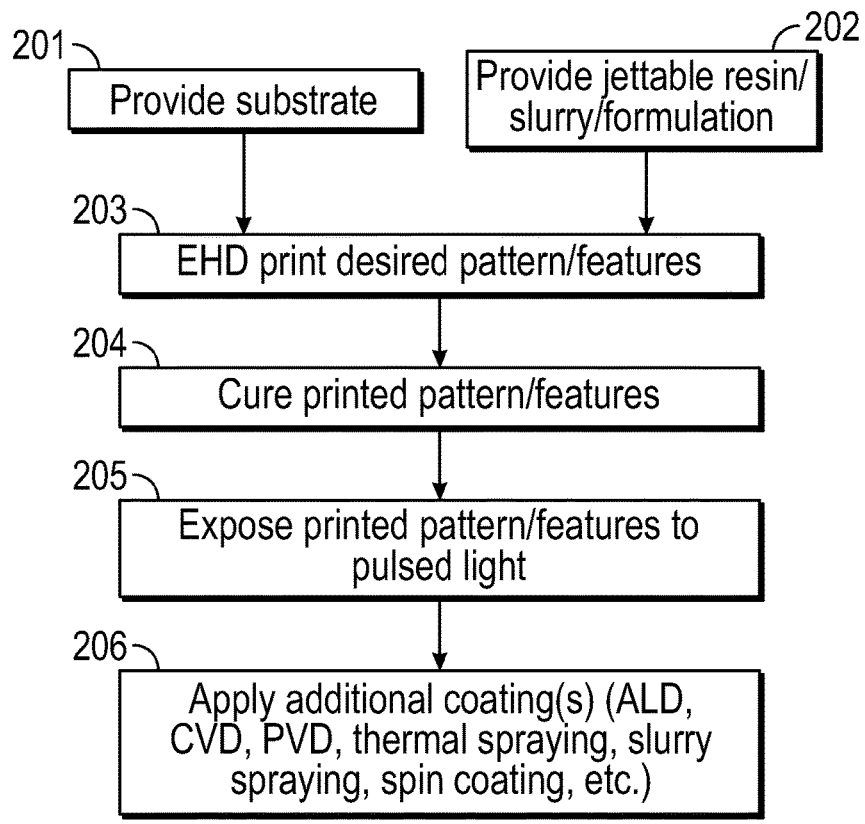
FIG. 2 is a graphical depiction of a method of fabricating high-resolution ceramic structures with, in some cases, controlled surface textures in accordance with embodiments.

With reference to FIG. 2, a method of fabricating ceramic structures of controlled size and composition is provided. As shown in FIG. 2, the method includes providing a substrate 201 and providing a supply of uncured preceramic resins, organometallic compounds, metal-organic compounds, oligomeric material and slurries including any of these alone or in combinations (e.g., jettable resin/slurry/formulation) 202 and using the supply of the uncured preceramic resins, organometallic compounds, metal-organic compounds, oligomeric material and slurries containing any of these alone or in combinations to print a pattern onto the substrate 203 by, for example, electrohydrodynamic (EHD) jetting, or e-jetting, deposition while pre-heating/heating. The method further includes curing the pattern 204 by exposure to radiation or by IPL processing, converting the preceramic to ceramic by IPL processing 205 and post-processing the ceramic 206 to thereby apply an additional coating by, for example, atomic layer deposition (ALD), chemical vapor deposition (CVD), physical vapor deposition (PVD), thermal spraying, slurry spraying, spin coating, etc., or any other similar process. Iterations of operations 203 through 206 are also possible in various sequences.

It is to be understood that, in some cases, preceramics can be, but are not necessarily, wholly or partially converted to crystalline material by IPL processing and there are other cases where preceramics are converted to ceramics but not necessarily crystalline ceramics. For those cases, where whole or partial conversion of preceramics to crystalline ceramics is desirable, the IPL processing can be designed and executed to complete the conversion to the crystalline state.

Where operations 203-206 are iterative, one might print a pattern and complete operations 203-206 and then repeat one or more of operations 203-206 in order to achieve either improved structures or to build upon previously fabricated patterns in a two+-dimensional (2D or 2.5D) printing method.

As explained above, the pattern can include features having sizes on the order of about 100 microns or less or, in some cases, on the order of about 10 microns or less and the preceramic materials can include resins and ceramic fillers. The resins can include at least one or more of polysilanes, polysiloxanes, polycarbosilanes, polysilazanes, polycarbosiloxanes, polycarbosilazanes, polyborosiloxanes, metal-modified derivatives, etc., and the fillers can include at least one or more of carbides, nitrides, borides, phosphides, carbonitrides, oxides, glasses, glass-ceramics, or metals, including aluminum, copper, silicon, titanium, vanadium, chromium, iron, cobalt, nickel, zinc, hafnium, zirconium, yttrium, lanthanum, ytterbium, gadolinium, niobium, tantalum, boron, tungsten, rhenium, molybdenum, gold, silver, platinum and palladium.

With reference to FIG. 3, certain features of the method of FIG. 2 are illustrated. As shown in FIG. 3, the method includes printing a pattern of uncured preceramic materials with features having sizes on the order of about 10 microns or less 301, radiating curing radiation toward the pattern to cure the pattern 302 and exposing the cured pattern to intense pulsed light (IPL) to wholly or partially convert the preceramic of the cured pattern to ceramic or crystalline ceramic 303. The method can further include at least one of heating the preceramic materials and heating the pattern as noted above and applying an additional coating to the ceramic or crystalline ceramic by ALD, CVD, PVD, thermal spraying, slurry spraying, spin coating, etc. 304.

Benefits of the features described herein are the provision of a highly versatile manufacturing/printing method that is fast (both e-jetting and IPL processes) and includes an optional coating method, such as atomic layer deposition, before or after resin conversion for compositional or structural control. Resins of interest include, but are not limited to, polysilanes, polysiloxanes, polycarbosilanes, polysilazanes, polycarbosiloxanes, polycarbosilazanes, polyborosiloxanes, metal-modified derivatives, etc., and the ceramic fillers can include at least one or more of carbides, nitrides, borides, phosphides, carbonitrides, oxides, glasses, glass-ceramics, or metals, including aluminum, copper, silicon, titanium, vanadium, chromium, iron, cobalt, nickel, zinc, hafnium, zirconium, yttrium, lanthanum, ytterbium, gadolinium, niobium, tantalum, boron, tungsten, rhenium, molybdenum, gold, silver, platinum and palladium. The substrates can be metallic, ceramic, glass, etc.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fabrication apparatus for fabricating ceramic structures of controlled size and composition, the fabrication apparatus comprising:
   an additive manufacturing machine configured to dispense preceramic materials in a printed pattern by electrohydrodynamic (EHD) deposition such that, the printed pattern corresponds to the ceramic structures of the controlled size and composition;
   a radiation emitter configured to emit curing radiation toward the printed pattern to cure the preceramic materials; and
   a lamp element configured to shine light on the preceramic materials to convert the preceramic materials to ceramics.

2. The fabrication apparatus according to claim 1, wherein the printed pattern corresponding to the ceramic structures of the controlled size and composition has features with sizes of about 10 microns or less.

3. The fabrication apparatus according to claim 1, wherein the printed pattern is dispensed on a substrate and the substrate comprises at least one or more of metallic materials, polymeric materials, carbon-based materials, composite materials, ceramic materials, glass materials, and glass/ceramic materials.

4. The fabrication apparatus according to claim 1, wherein the additive manufacturing machine comprises a heating element to heat the preceramic materials and a stage heater to heat a substrate on which the printed pattern is dispensed.

5. The fabrication apparatus according to claim 1, wherein the preceramic materials comprise resins with or without fillers, the resins comprising at least one or more of polysilanes, polysiloxanes, polycarbosilanes, polysilazanes, polycarbosiloxanes, polycarbosilazanes, polyborosiloxanes, and metal-modified derivatives of the at least one or more of the polysilanes, the polysiloxanes, the polycarbosilanes, the polysilazanes, the polycarbosiloxanes, the polycarbosilazanes, and the polyborosiloxanes, and the fillers comprise at least one or more of carbides, nitrides, borides, phosphides, carbonitrides, oxides, glasses, glass-ceramics, or metals, wherein the metals comprise one or more of aluminum, copper, silicon, titanium, vanadium, chromium, iron, cobalt, nickel, zinc, hafnium, zirconium, yttrium, lanthanum, ytterbium, gadolinium, niobium, tantalum, boron, tungsten, rhenium, molybdenum, gold, silver, platinum, and palladium.

6. The fabrication apparatus according to claim 1, wherein the lamp element comprises a xenon flash lamp operable to generate intense pulsed light (IPL) to convert the preceramic materials to ceramics in about 1 second or less.

7. A fabrication apparatus for fabricating ceramic structures of controlled size and composition, the fabrication apparatus comprising:
an additive manufacturing machine configured to execute electrohydrodynamic (EHD) deposition to dispense preceramic materials in a printed pattern, the printed pattern corresponding to the ceramic structures of the controlled size and composition;
a radiation emitter configured to emit curing radiation toward the printed pattern to cure the preceramic materials; and
a lamp element configured to shine light on the preceramic materials to convert the preceramic materials to ceramics in about 1 second or less by intense pulsed light (IPL) processing.

8. The fabrication apparatus according to claim 7, wherein the printed pattern corresponding to the ceramic structures of the controlled size and composition has features with sizes of about 10 microns or less.

9. The fabrication apparatus according to claim 7, wherein the printed pattern is dispensed on a substrate and the substrate comprises at least one or more of metallic materials, polymeric materials, carbon-based materials, composite materials, ceramic materials, glass materials, and glass/ceramic materials.

10. The fabrication apparatus according to claim 7, wherein the additive manufacturing machine comprises a heating element to heat the preceramic materials and a stage heater to heat a substrate on which the printed pattern is dispensed.

11. The fabrication apparatus according to claim 7, wherein the preceramic materials comprise resins with or without fillers, the resins comprising at least one or more of polysilanes, polysiloxanes, polycarbosilanes, polysilazanes, polycarbosiloxanes, polycarbosilazanes, polyborosiloxanes, and metal-modified derivatives of the at least one or more of the polysilanes, the polysiloxanes, the polycarbosilanes, the polysilazanes, the polycarbosiloxanes, the polycarbosilazanes, and the polyborosiloxanes, and the fillers comprise at least one or more of carbides, nitrides, borides, phosphides, carbonitrides, oxides, glasses, glass-ceramics, or metals, wherein the metals comprise one or more of aluminum, copper, silicon, titanium, vanadium, chromium, iron, cobalt, nickel, zinc, hafnium, zirconium, yttrium, lanthanum, ytterbium, gadolinium, niobium, tantalum, boron, tungsten, rhenium, molybdenum, gold, silver, platinum, and palladium.

12. The fabrication apparatus according to claim 7, wherein the lamp element comprises a xenon flash lamp operable to generate IPL to convert the preceramic materials to the ceramics in about 1 second or less.

13. A fabrication apparatus for fabricating ceramic structures of controlled size and composition, the fabrication apparatus comprising:
an additive manufacturing machine configured to execute electrohydrodynamic (EHD) deposition to dispense preceramic materials in a printed pattern, the printed pattern corresponding to the ceramic structures of the controlled size and composition;
a radiation emitter configured to emit curing radiation toward the printed pattern to cure the preceramic materials; and
a lamp element configured to shine light on the preceramic materials to convert the preceramic materials to ceramics.

14. The fabrication apparatus according to claim 13, wherein the printed pattern corresponding to the ceramic structures of the controlled size and composition has features with sizes of about 100 microns or less.

15. The fabrication apparatus according to claim 13, wherein the printed pattern corresponding to the ceramic structures of the controlled size and composition has features with sizes of about 10 microns or less.

16. The fabrication apparatus according to claim 13, wherein the printed pattern is dispensed on a substrate and the substrate comprises at least one or more of metallic materials, polymeric materials, carbon-based materials, composite materials, ceramic materials, glass materials, and glass/ceramic materials.

17. The fabrication apparatus according to claim 13, wherein the additive manufacturing machine comprises a heating element to heat the preceramic materials and a stage heater to heat a substrate on which the printed pattern is dispensed.

18. The fabrication apparatus according to claim 13, wherein the preceramic materials comprise resins with or without fillers, the resins comprising at least one or more of polysilanes, polysiloxanes, polycarbosilanes, polysilazanes, polycarbosiloxanes, polycarbosilazanes, polyborosiloxanes, and metal-modified derivatives of the at least one or more of the polysilanes, the polysiloxanes, the polycarbosilanes, the polysilazanes, the polycarbosiloxanes, the polycarbosilazanes, and the polyborosiloxanes, and the fillers comprise at least one or more of carbides, nitrides, borides, phosphides, carbonitrides, oxides, glasses, glass-ceramics, or metals, wherein the metals comprise one or more of aluminum, copper, silicon, titanium, vanadium, chromium, iron, cobalt, nickel, zinc, hafnium, zirconium, yttrium, lanthanum, ytterbium, gadolinium, niobium, tantalum, boron, tungsten, rhenium, molybdenum, gold, silver, platinum, and palladium.

19. The fabrication apparatus according to claim 13, wherein the lamp element comprises a xenon flash lamp operable to generate intense pulsed light (IPL) to convert the preceramic materials to the ceramics in about 1 second or less.

* * * * *